May 21, 1929.  H. A. HUMPHREY  1,714,370
CENTRIFUGAL APPARATUS
Filed Nov. 26, 1927
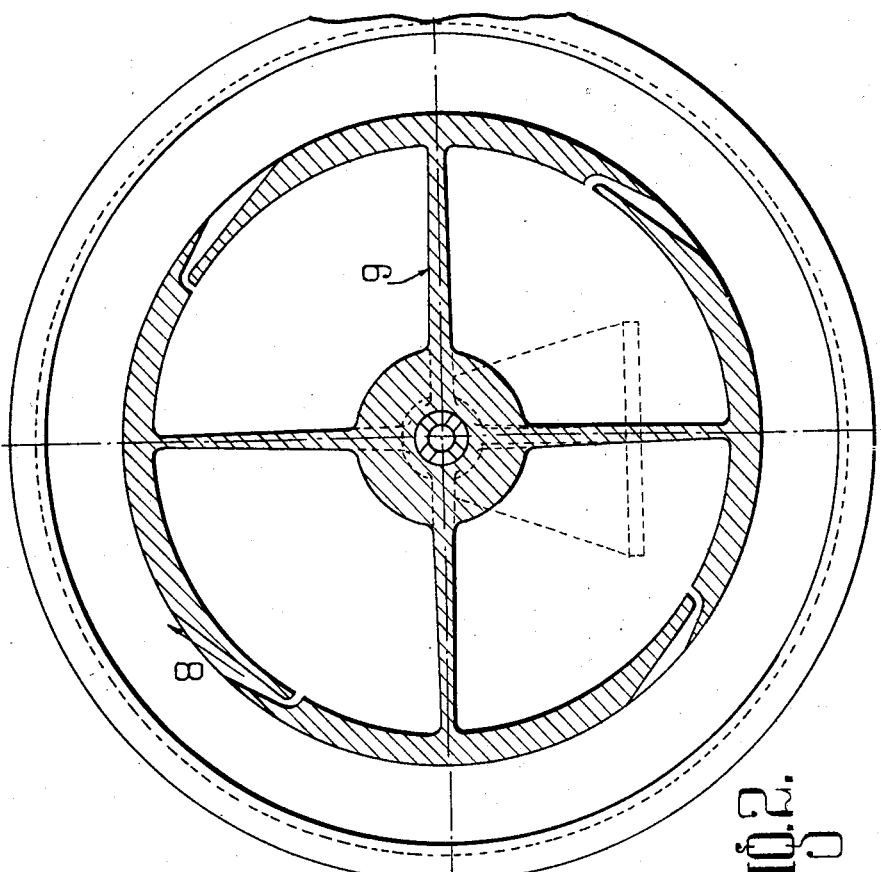
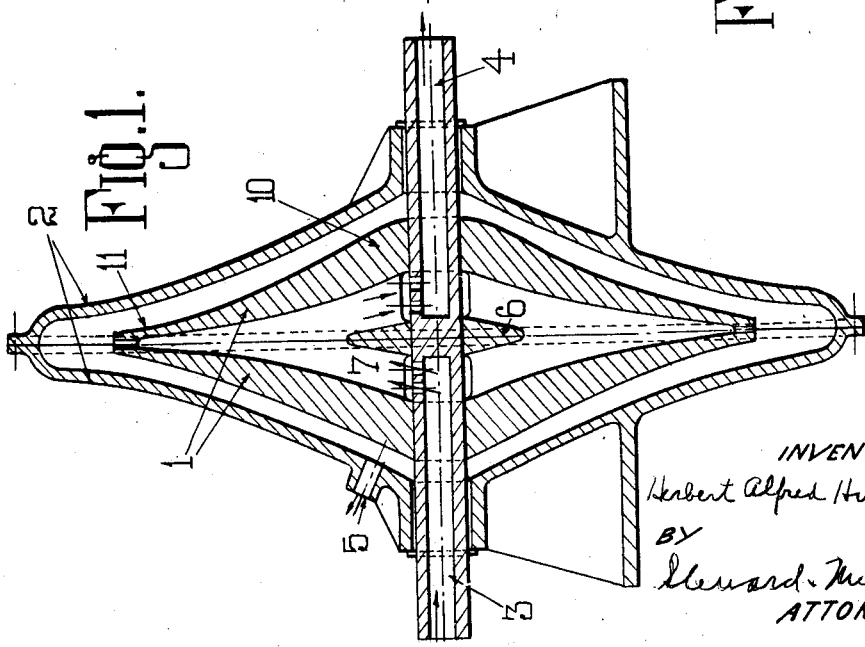
INVENTOR
Herbert Alfred Humphrey
BY
Menard McKay
ATTORNEYS Patented May 21, 1929.

1,714,370

UNITED STATES PATENT OFFICE.

HERBERT ALFRED HUMPHREY, OF STOCKTON-ON-TEES, ENGLAND, ASSIGNOR TO IMPERIAL CHEMICAL INDUSTRIES LIMITED, OF LONDON, ENGLAND, A BRITISH COMPANY.

CENTRIFUGAL APPARATUS.

Application filed November 26, 1927, Serial No. 235,978, and in Great Britain January 15, 1927.

This invention relates to centrifugal apparatus and to the separation of fluids in such apparatus. The invention particularly relates to a process and apparatus for the high speed centrifugal separation of the constituents of mixed gases.

Although proposals have been made to effect the separation of a mixture of gases having different densities by means of centrifugal action the exceptional difficulties attendant upon the construction of proper apparatus have so far prevented their practical success.

The efficiency of any such apparatus depends principally upon two factors. In the first place a sufficiently high velocity must be imparted to the gases, and secondly the removal of the more or less separated constituents must be effected continuously and without stopping the apparatus. This last condition assures that the treated gas at each stage approaches the equilibrium conditions of separation theoretically corresponding to that stage so that the conducting away of the gases may be done from the equilibrium state.

Up to the present the usual type of apparatus has consisted essentially of a cylindrical vessel or drum capable of rapid rotation about its axis. In such an apparatus the denser of the contained gases are forced towards the periphery of the drum while the lighter constituents remain near the middle, and arrangements are made for continuously drawing off the so separated gases. But the degree of separation effected in these apparatus has hitherto always been very small, being directly limited by the maximum peripheral speed attained by the rotating container. I have found that considerably higher peripheral speeds are essential to success, and indeed so high that it would be impossible to secure them with the kind of apparatus hitherto employed for the purpose. Thus no metal cylinder, however thick, would withstand the stresses due to such a high peripheral speed as 600 metres per second, which is a speed of the order that I desire to use.

The idea of the construction of my improved apparatus may be obtained by imagining two shallow conical pans put together so that their rims coincide, this hollow apparatus then being capable of rapid rotation about the common axis of the two cones. The essential and novel condition that I apply to the construction of this apparatus is the making of the walls of the vessel of greater thickness towards the middle and of less thickness towards the periphery so that the actual stresses under working conditions may be approximately equal throughout. Thus the cross-section of the metal walls along any line parallel with the axis of rotation continuously decreases as the distance of the section line from the axis increases. I have found that such a construction is the only one that will withstand such extremely high peripheral speeds as I desire to employ. Preferably I make the walls of the container curved (in a plane through the axis) so that the internal faces of the vessel are convex to each other. The shaft on which the container is mounted is preferably made hollow so that the initial gaseous mixture may pass along the hollow shaft and so enter the apparatus, while the lighter of the separated gases may leave through the other end of the hollow shaft, a solid portion of the shaft separating the inlet and outlet. Radial vanes joining opposite sides of the vessel may be provided in the apparatus so as to give the contained gases the movement of a forced vortex and to ensure that all the gas is subjected to the centrifugal force a mid-feather is provided between the inlet and outlet of the hollow shaft, extending some way from the outside of the shaft towards the circumference of the apparatus. The heavier gases leave at the edge of the apparatus through nozzles formed in the solid rim of the wheel. These nozzles are in the form of passages flaring towards the outlet and as nearly as possible tangential to the circumference. The nozzles point in the opposite direction to that of rotation of the apparatus and through them the heavier gases are discharged with high velocity due to the pressure reigning within the apparatus near the rim. In virtue of the shape of the nozzles a considerable part of the energy of compression of the gases is given up to the wheel and thereby the amount of power required to drive the apparatus is very much lessened.

With the apparatus hereinbefore described it is possible to attain such high speeds that the compression of the gases due to centrifugal force is very considerable, and when the temperature is below the critical temperature of the gas or gases liquefaction may be effected. In such a case the efficiency of separation may approach 100 per cent since the density of the liquid greatly exceeds that of the gas from which it is formed, provided that the temperature is not too close to the critical temperature. The disparity between the density of gas and liquid is greater the lower the temperature and therefore it is very advantageous to work at a low temperature. To this end the entering gaseous mixture may be precooled and in some cases precompressed. As an example of this kind of separation it may be mentioned that carbon dioxide may be efficiently separated from gases containing same. Particles of liquid carbon dioxide will be formed near the periphery of the rotating vessel and will be sprayed outwards through the tangential nozzles. In so expanding some carbon dioxide will gasify and a part may congeal to the solid, but the heat effect consequent upon liquefaction will tend to prevent this solidification. In order to ensure continuous removal of carbon dioxide as liquid the latent heat of liquefaction given out in the apparatus must be removed, and the cold produced by the subsequent evaporation of the liquid may be utilized for this purpose. Since these heat effects are counterparts no external means for removal of heat need be employed, and the cold expanded carbon dioxide need only be led away through an outer casing so that it may give up its cold to the rotating system.

This new method of separating condensible gases is only made possible by my improved construction of apparatus, which permits of obtaining peripheral speeds hitherto impossible. While such construction allows much more perfect separation of condensible gas from a mixture with a permanent gas or gases, it is also very efficient in dealing with mixtures of permanent gases only, for example air. When permanent gases are being treated one passage through my apparatus may not effect sufficient separation and therefore I may send the lighter and/or the heavier fractions to other similar apparatus for further treatment. In this way a fractionation of the original gas mixture may be effected.

Figures 1 and 2 show sections of one form of the apparatus taken through the shaft and transversely through the shaft respectively. 1 is the rotating part of the apparatus, and 2 is the stationary casing which carries the shaft to which the rotating portion is fixed. The mixed gas enters at 3, the portion of the gas in which the lighter constituents are increased leaves at 4, and the portion of the gas in which the heavier constituents are increased leaves at 5. 6 is a mid-vane to ensure that the gas passing from the hollow shaft through the ports shown in the space 7 shall be subjected to centrifugal action before it can pass out through ports into the hollow part of the shaft on the opposite side of the mid-vane. One of the nozzles through which the heavier gas leaves the rotating portion is shown at 8. Figure 2 and one of the radial vanes is shown at 9. It will be noticed that the walls of the rotating portion are made thickest near the shaft, as at 10 and thinnest at the periphery as at 11, and it is by this construction only that the high speeds necessary can be attained in practice.

I claim as my invention:

1. Process for the continuous centrifugal separation of gases comprising supplying the gases near the axle of a centrifugal apparatus rotating at such a speed that the heavy constituents of the gas mixture is liquefied, removing said liquefied gas and withdrawing the lighter constituents near the centre of the apparatus.

2. Process for the continuous centrifugal separation of gases comprising pre-cooling said gases, supplying them near the centre of a centrifugal apparatus, rotating said apparatus at such a speed that the heavy constituents of the gas mixture is liquefied, removing said liquefied gas at the periphery of the apparatus, and withdrawing the lighter constituents near the centre of the apparatus.

3. Process for the continuous centrifugal separation of gases comprising pre-cooling and pre-compressing said gases, supplying them near the centre of a centrifugal apparatus rotating said apparatus at such a speed that the heavy constituent is liquefied, removing said liquefied gas from the periphery of the apparatus, and withdrawing the lighter constituents near the centre of the apparatus.

4. An apparatus for the continuous centrifugal separation of gases comprising a stationary casing, having an outlet for the heavier gases, a hollow axle, divided transversely in the middle and adapted to feed in the gas mixture, and to withdraw the lighter components, a hollow double conical rotor, mounted on said axle in said casing, having outwardly flared tangential nozzles to withdraw the heavier gases at its periphery, a baffle, mounted transversely on said axle, and means to drive said rotor at a high speed.

5. An apparatus for the continuous centrifugal separation of gases comprising a stationary casing, having an outlet for the heavier gases, a hollow axle, divided transversely in the middle and adapted to feed in the gas mixture, and to withdraw the lighter components, a hollow double conical rotor, mounted on said axle in said casing, having means to withdraw the heavier gases at its periphery, a baffle, mounted transversely on said axle, means to drive said rotor at a high speed, and an outlet for the separated and expanded heavier gases, near the centre of said casing so that said gases are led in heat exchange relation to the incoming gases.

6. An apparatus for the continuous centrifugal separation of gases comprising a stationary casing, having an outlet for the heavier gases, a hollow axle, divided transversely in the middle and adapted to feed in the gas mixture, and to withdraw the lighter components, a hollow double conical rotor, mounted on said axle in said casing, having outwardly flared tangential nozzles to withdraw the heavier gases at its periphery, a baffle, mounted transversely on said axle, means to drive said rotor at a high speed, and an outlet for the separated and expanded heavier gases, near the centre of said casing so that said gases are led in heat exchange relationship to the incoming gases.

7. An apparatus for the continuous centrifugal separation of gases, comprising a stationary casing, having an outlet for the heavier gases, a hollow axle, divided transversely in the middle, and adapted to feed in the gas mixture, and to withdraw the lighter components, a hollow rotor consisting of two opposed conical disks of a thickness uniformly decreasing towards their periphery, said disks being mounted on said axle in said casing and having means to withdraw the heavier gas at their periphery, a baffle mounted transversely on said axle and means to drive said rotor at a high speed.

8. Apparatus for the continuous centrifugal separation of gases comprising a stationary casing, having an outlet for the heavier gases, a hollow axle divided transversely in the middle, and adapted to feed in the gas mixture, and to withdraw the lighter components, a hollow rotor consisting of two opposed conical disks, of a thickness uniformly decreasing towards their periphery, said disks being curved towards one another, and their thickness being such as to produce approximately equal stresses throughout when the apparatus is in action, and being mounted on said axle in said casing, and having means to withdraw the heavier gas at their periphery, a baffle mounted transversely on said axle and means to drive said rotor at a high speed.

9. An apparatus for the continuous centrifugal separation of gases comprising a stationary casing, having an outlet for the heavier gases, a hollow axle, divided transversely in the middle, and adapted to feed in the gas mixture and to withdraw the lighter components, a hollow rotor mounted on said axle in said casing, consisting of two opposed conical disks of a thickness uniformly decreasing towards their periphery, and having means to withdraw the heavier gases at their periphery, radial partitions dividing up said rotor into a number of compartments, a baffle mounted transversely on said axle, and means to drive said rotor at a high speed.

In witness whereof, I have hereunto signed my name this 8th day of November, 1927.

HERBERT ALFRED HUMPHREY.